United States Patent [19]
Stone

[11] Patent Number: 5,229,574
[45] Date of Patent: Jul. 20, 1993

[54] PRINT QUALITY LASER MARKER APPARATUS

[75] Inventor: J. James Stone, Northbrook, Ill.

[73] Assignee: Videojet Systems International, Inc., New Prague, Minn.

[21] Appl. No.: 775,495

[22] Filed: Oct. 15, 1991

[51] Int. Cl.$^5$ ............................................. B23K 26/00
[52] U.S. Cl. .......................... 219/121.68; 219/121.69; 219/121.74; 219/121.76; 219/121.82
[58] Field of Search ....................... 219/121.68, 121.69, 219/121.74, 121.76, 121.82; 346/76 L

[56] References Cited

U.S. PATENT DOCUMENTS 4,125,755  11/1978  Plamquist ................... 219/121.76 X
4,652,722  3/1987   Stone et al. ..................... 214/121.76

Primary Examiner—C. L. Albritton
Attorney, Agent, or Firm—Rockey, Rifkin and Ryther

[57] ABSTRACT

Laser marker apparatus for marking indicia onto a substrate includes an exit lens having a focal length, a plurality of lasers, a plurality of turning mirrors, and at least one directing mirror. The surface of the substrate to be marked is positioned generally at the focal plane of the lens. The plurality of lasers is arranged so that their energy output beams are oriented in a generally parallel relationship. The plurality of turning mirrors are positioned along the beam path of each respective laser and are oriented to reflect the output beams at predetermined angles. The directing mirrors redirect the output beams to form a column of spaced apart spots on the substrate. One of the directing mirrors is then moved in a first direction so as to form another column of spots on the substrate. Movement in another direction forms a third column of spots on the substrate. The columns are interleaved to create a composite column of higher resolution for marking Alpha-numeric characters.

11 Claims, 3 Drawing Sheets

PRINT QUALITY LASER MARKER APPARATUS

BACKGROUND OF THE INVENTION

This invention relates generally to apparatus for marking moving objects or substrates and more particularly, it relates to an improved laser marker apparatus for suitably coding paper labels, other substrates, printed material, plastic, painted surfaces and the like in which the number of dot positions in a vertical column is increased, thereby producing a higher resolution than has been traditionally available.

In U.S. Pat. No. 4,652,722 issued on Mar. 24, 1987, there is disclosed a laser marking apparatus which utilizes seven lasers for generating a 7-dot high character matrix and is assigned to the same assignee as the present invention. In particular, the laser beam from each source is directed by fixed mirrors through a single exit lens and then onto the surface to be marked. Individual laser mirrors each corresponding with one of the lasers are not movable and remain stationary during normal operation of the apparatus, even though they are adjustable for initial system alignment. The surface to be marked is positioned on a conventional conveyor or other device adapted to move the objects along a linear path adjacent the laser output head.

Each laser defines an essentially collimated energy source which is focused, by the exit lens, into a dot of a predetermined small size for precision marking of article surfaces as they pass the output head substantially in the focal plane of the exit lens. The incident angle of each of the seven laser sources onto the exit lens is initially adjusted to provide a plurality of closely spaced and focused dots which define a vertical column of seven light dots from which the character matrix can be obtained by modulation of the dots as the article or substrate is moved past the exit lens.

In order to produce higher printing quality for the character matrix, there is a need to generate a higher number of spots or dots for each vertical column. Simply increasing the number of lasers is impractical since the system costs would increase dramatically due to the increased components used. For example, if it was desired to provide a vertical column of 21 dots so as to improve the resolution by a factor of three, then there would be required an additional 14 lasers and associated components therefor. Also, it has been envisioned that the laser mirror 24 of the '722 patent used to reflect the beams from the respective mirrors 36a-36g via the delivery tube 18 to the exit lens 26 through the delivery tube 20 could be simply rotated so as to move the seven dots up or down to produce the 21 dots. However, this technique would require that the diameter of the exit lens 26 be increased by approximately two inches, thereby increasing substantially the system costs.

Accordingly, there is a need for an improved laser marker apparatus which has higher resolution but without increasing substantially its cost and complexity. The present invention represents an improvement over the aforementioned U.S. Pat. No. 4,652,722, which patent is hereby incorporated by reference.

SUMMARY OF THE INVENTION

Accordingly, it is a general object of the present invention to provide an improved laser marker apparatus which is relatively simple and economical to manufacture and assemble.

It is an object of the present invention to provide a laser marker apparatus for marking indicia onto a substrate in which the number of dot positions in a vertical column is increased, thereby producing a higher resolution than has been traditionally available.

It is another object of the present invention to provide a laser marker apparatus which includes at least one directing mirror which is movable so as to form plural columns of spots, each of the columns having multiple spots so as to produce an increased number of spots when aligned in a vertical column.

In accordance with these aims and objectives, the present invention is concerned with the provision of a laser marker apparatus for marking indicia onto a substrate which includes an exit lens having a focal length, a plurality of lasers, a plurality of turning mirrors, and a directing mirror. The surface of the substrate to be marked is positioned generally at the focal plane of the exit lens. The plurality of lasers are arranged so that their energy output beams are oriented in a generally parallel relationship. The plurality of turning mirrors are positioned along the beam path of each respective laser and are oriented to reflect the output beams to the exit lens 40 at predetermined angles. The directing mirror is used for redirecting the output beams from the plurality of turning mirrors onto the center of the exit lens at the predetermined angles between the beams so as to form a first column of first spots on the substrate.

The distance between each of the first spots is determined by the angular difference between the output beams. The directing mirror is movable in a first direction so as to form a second column of second spots on the substrate. Each of the second spots is disposed above a corresponding one of the first spots. The directing mirror is further movable in a second direction so as to form a third column of third spots on the substrate. Each of the third spots is disposed below a corresponding one of the first spots.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1:
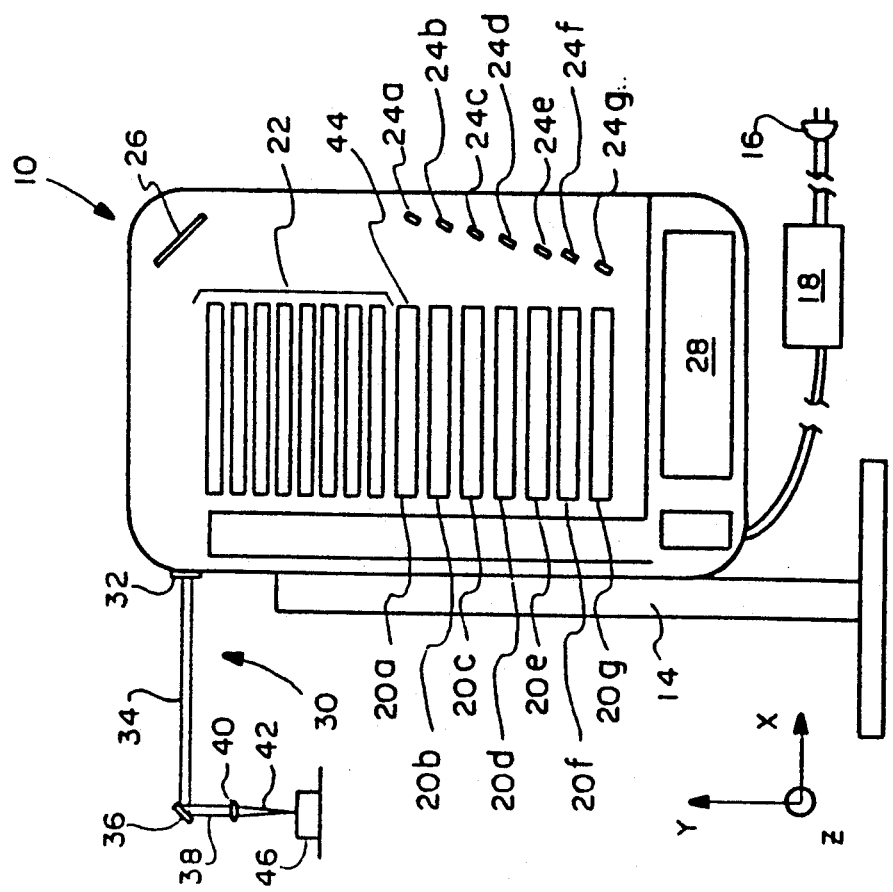
FIG. 1 is an elevational representation of a laser marker apparatus, constructed in accordance with the principles of the present invention.
Figure 2:
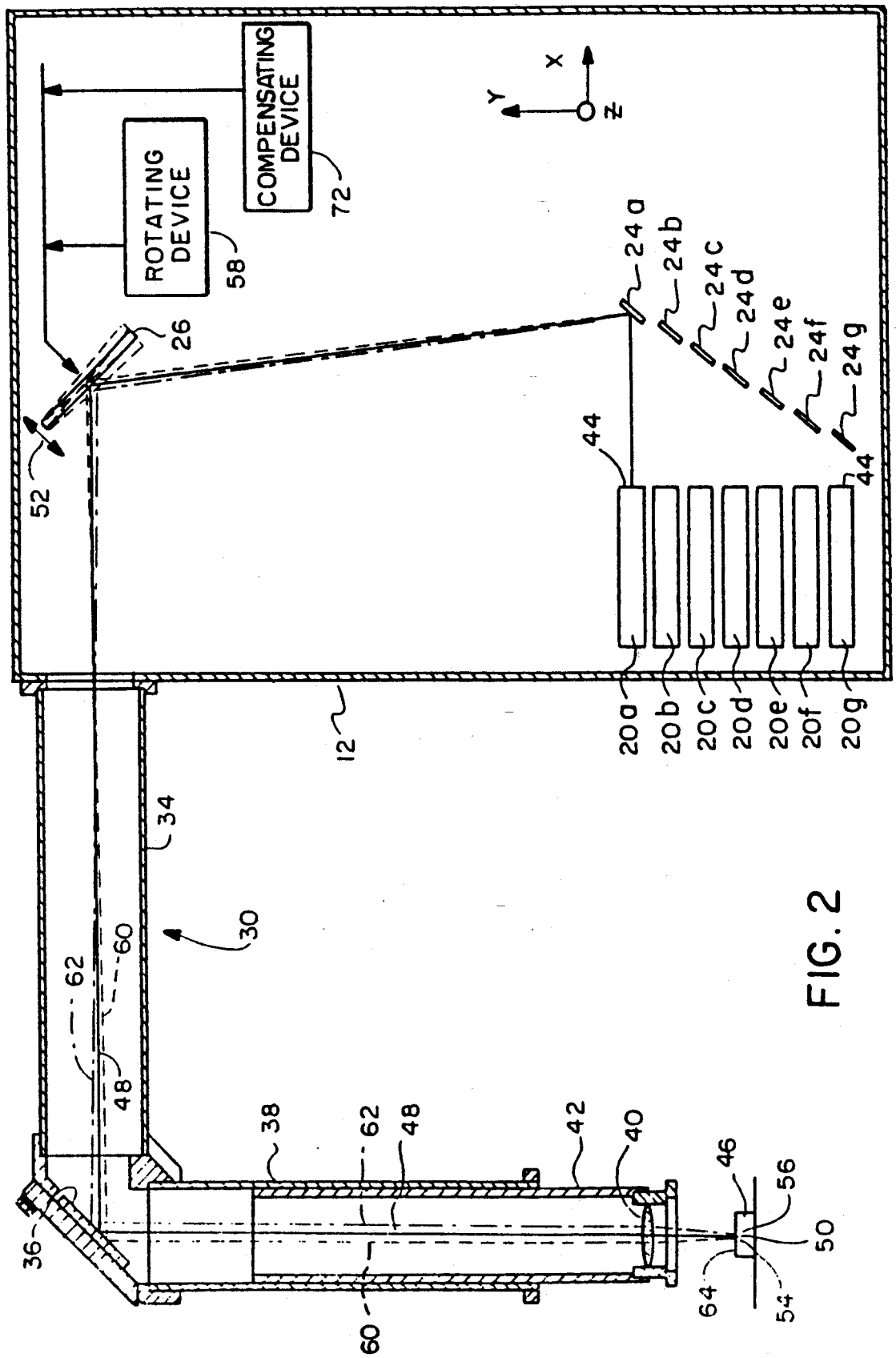
FIG. 2 is an enlarged schematic view of a portion of the laser apparatus of FIG. 1.

Referring now in detail to the drawings, there is shown in FIGS. 1 and 2 a diagrammatical representation of a laser marker apparatus 10 constructed in accordance with the principles of the present invention. The laser marker apparatus of the present invention is adapted to mark or inscribe alphanumeric characters or other symbols definable within a matrix of predetermined number of dot rows onto the surface of movable articles, such as product packaging, beverage containers, bottle closures, labels, substrates and the like. The laser apparatus 10 includes a housing or cabinet 12 mounted on a support stand structure 14 and being adapted to receive a source of power via an A.C. wall-plug 16 and a power conditioning unit 18.

The cabinet 12 is used to house a plurality of lasers 20a-20g, a corresponding number of RF laser excitation sources 22 over the respective lasers, a plurality of turning mirrors 24a-24g, an interior directing mirror 26, and a microprocessor controller 28. A laser head unit 30 is mounted exteriorly of the upper end portion of the cabinet 12 via mounting flange 32. The head unit is comprised of a horizontal beam delivery tube 34, an exterior directing mirror 36, a vertical beam delivery tube 38, and an exit lens 40. The directing mirror 36 is located at the intersection of the horizontal and vertical delivery tubes 34, 38. The exit lens 40 is preferably arranged at the lower end of the vertical lens tube 42 which is movable telescopingly in the delivery tube 38 so as to permit focusing.

The laser apparatus 10 is described with reference to the coordinates X, Y, and Z of the orthogonal coordinate system illustrated in the drawings. In the preferred embodiment, the seven lasers 20a-20g are $CO_2$ gas lasers arranged vertically in the Y-direction within the cabinet 12, as illustrated in FIGS. 1 and 2. The light output beams from these lasers are passed through their respective output ends 44 in the X-direction and then impinge upon corresponding seven turning mirrors 24a-24g. The seven lasers 20a-20g direct substantially collimated light beams, which have a divergence of approximately 4 milliradians, into the corresponding seven turning mirrors 24a-24g. The turning mirrors reflect the beams off the directing mirror 26, through the delivery tube 34, and into the directing mirror 36. Thereafter, the beams are passed through the delivery tube 38 and into optical contact with the exit lens 40.

The path of the light beam from one of the lasers (i.e., laser 20a) to a marking article 46 when the directing mirror 26 is in the initial or reference position is illustrated by solid line 48 in FIG. 2. In this manner, the laser beams from the lasers 20a-20g are focused as seven discrete spots or dots 50 onto the surface of the article 46 (one of which is shown in FIG. 2). These seven discrete dots extend preferably along a line in the X-direction which is transverse to the direction of the article movement (which is in the Z-direction that is perpendicular to the plane of the drawing). The seven discrete dots 50 define reference marking spots when the directing mirror 26 is positioned in the reference position shown in solid line in FIG. 2. This line in the X-direction defines a single column of the characters or symbols to be marked. As the article to be marked passes the laser head unit, each laser describes a track or line on the article surface which defines a corresponding row of the character matrix to be marked. In the preferred embodiment of the present invention, the seven discrete dots 50 are uniformly spaced thereby forming evenly spaced parallel character rows.

The turning mirrors 24a-24g are rigidly mounted and do not move during normal marking operations. However, the turning mirrors are adjustable for initial system alignment to provide the necessary angular separation between adjacent beams but do not generally require further movement thereafter. This is achieved by the lateral positioning of the turning mirrors along the X-direction. Unlike the fixedly mounted laser mirror 24 in the '722 patent, the directing mirror 26 is rotatably mounted about an axis extending in the Z-direction.

Figure 5:
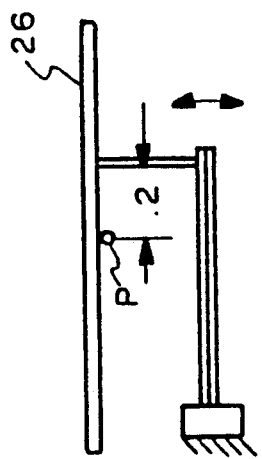
FIG. 5 is a schematic representation of a rotating device for the mirror 26 or 36.

The mirror 26 can be rotated about a point P at or near its center. One method of doing this is to use a piezo-electric bimorph element that is rigidly mounted at one end and is coupled to mirror 26 a distance r beyond the point P as shown in FIG. 5. When voltage is applied to the bimorph, it will be caused to bend, rotating the mirror about point P. To obtain the required three positions for the mirror, the bimorph receives voltages of zero, V and 2 V volts. The actual values being determined by the type of piezo device actually employed for the required mirror displacement. Examples of piezo-electric devices suitable for present purposes include those devices manufactured by the Vernitron Division of Morgan Matroc, Inc., Bedford, Ohio.

A second method of rotating the mirror 26 (or as described in an alternate embodiment hereafter, mirror 36) is to employ the well known galvanometer method. This method is not as fast as a piezo-electric device, but may be satisfactory for smaller mirrors and slower marking devices. Such an arrangement employs permanent magnets disposed on either side of the mirror which is mounted for rotation and which carries a coil. A current passing through the coil causes the mirror to deflect in a direction and by an amount proportional to the magnitude and polarity of the current. Other suitable techniques for rotating the mirror include magnetostrictive elements and for some applications, servomechanisms.

The directing mirror 26 is movable about the Z-axis through an angle $\Delta\alpha$ in the directions generally indicated by the doubled-headed arrows 52. When the directing mirror 26 is rotated $\Delta\alpha$, as shown in phantom in the counter-clockwise direction, seven additional discrete dots 54 defining upper marking spots (one being shown) are produced onto the surface of the article 46 each dot being disposed vertically in the X-direction above the corresponding reference marking spots 50. The path of the light beam from the laser 20a to the marking article 46 when the directing mirror 26 has been rotated $\Delta\alpha$ in a counter-clockwise direction from the reference position is illustrated by the line dotted 60 in FIG. 2

When the directing mirror is rotated $\Delta\alpha$, as shown in phantom, in the clockwise direction, another seven additional discrete dots 56 defining lower marking spots (one being shown) are produced onto the surface of the article 46 each dot being disposed vertically in the X-direction below the corresponding reference marking spots 50. The path of the light beam from the laser 20a to the marking article 46 when the directing mirror 26 has been rotated $\Delta\alpha$ in the clockwise direction from the reference position is illustrated in the dotted line 62 in FIG. 2.

Figure 4:
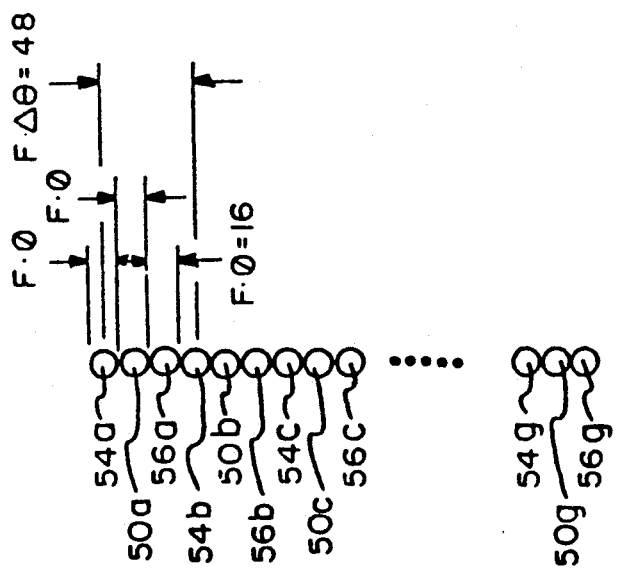
FIG. 4 is a magnified representation of the focused dots produced by the laser marker apparatus of the present invention, illustrating the appropriate dot size and inter-dot spacing relationship.

FIG. 4 represents twenty-one dots interleaved from three spot groups 50a–50g, 54a–54g and 56a–56g comprising a single column written by the present apparatus. As previously pointed out, sequential adjacent columns may be written to form a character matrix as the article being marked moves past the laser marking apparatus 10. Each of the dots in the three spot groups 50a–50g, 54a–54g and 56a–56g comprises one point within a distinct character row which is written onto the moving article 46.

The operation of the laser marking apparatus 10 will now be explained as to how the twenty-one interleaved dots of FIG. 4 are produced. In the preferred embodiment, the directing mirror 26 is initially rotated through the angle $\Delta\alpha$ in the counter-clockwise direction relative to the reference position and the lasers 20a–20g are pulsed so as to simultaneously produce the first group of seven upper marking spots 52a–52g corresponding to every third dot of the character matrix column. Next, the directing mirror 26 is rotated $\Delta\alpha$ to the reference position and the lasers 20a–20g are pulsed again so as to simultaneously produce the second group of seven reference marking spots 50a–50g corresponding to every third dot of the character matrix column (each being positioned below the corresponding one of the upper marking dots 52a–52g). Finally, the directing mirror 26 is rotated through another angle $\Delta\alpha$ in the clockwise direction relative to the reference position and the lasers 20a–20g are pulsed once more so as to simultaneously produce the third group of seven lower marking spots 54a–54g corresponding to every third dot of the character column (each being positioned below the corresponding reference marking spots 50a–50g).

Figure 3:
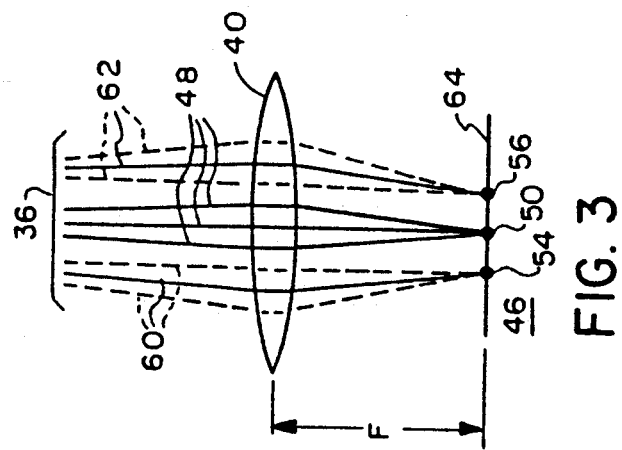
FIG. 3 is a schematic elevational view of the laser optical relationships for one laser beam and the three positions of the directing mirror.

FIG. 3 depicts the optical relationship pertaining to the exit lens having a focal length "F." In normal operation, the articles 46 are passed adjacent the laser head unit 30 so that the surface 64 to be marked is positioned substantially within the focal plane of the exit lens 40. The solid lines 48 represent the light beams from any given laser 20a–20g (i.e., laser 20a) when the directing mirror 26 is in the reference position. Similarly, the dotted lines 60 represent the light beams from the laser 20a when the directing mirror 26 has been rotated the angle $\Delta\alpha$ in the counter-clockwise direction, and the dotted lines 62 represent the light beams from the laser 20a when the directing mirror has been rotated the angle $\Delta\alpha$ in the clockwise direction.

Even though the light output beam from the laser 20a is highly collimated, it is not absolutely parallel but rather diverges at a known small angle $\Delta\phi$ which is approximately 4 milliradians. Accordingly, the light from the laser 20a does not focus to a point of infinitesimal size, but to a finite dot or spot of finite proportions. The diameter of each dot is determined by the well-known relationship that the dot diameter is the product of the beam divergence $\Delta\phi$ and the focal length F as follows:

$$Dot\ Diameter = F \cdot \Delta\phi$$

For example, with a typical focal length of four inches and a beam divergence of 4 milliradians, the dot diameter is calculated to be:

$$\begin{aligned} Dot\ Diameter &= 4\ inches \times .004\ radians \\ &= 0.016\ inches \end{aligned}$$

As is known to those skilled in the art, the spot separation of adjacent dots on the surface to be marked within each group is determined by the angular difference $\Delta\theta$ in the angular path between adjacent beams times the focal length. Thus, there is given:

$$Spot\ Separation = F \cdot \Delta\theta$$

The turning mirrors are spaced laterally in the X-direction so as to provide the angular difference $\Delta\theta$ in the angular path between adjacent beams. For the normal 4 milliradians beam (for example as described in the '722 patent) the angle $\Delta\theta$ is typically made to be equal to 4 milliradians so as to produce dots that are tangential to each other. However, the value of the angle $\Delta\theta$ has been chosen in the present invention to be equal to three times $\Delta\theta$ so that the spot separation of adjacent dots are three dot diameters apart as shown in FIG. 4. Thus, the angle between adjacent beams is selected to be $3 \times 4$ milliradians or 12 milliradians. The spot separation can now be calculated as follows:

$$\begin{aligned} Spot\ Separation &= 4\ inches \times .012\ radians \\ &= .048\ inches \end{aligned}$$

In order to move the dots up or down by one dot diameter, the directing mirror 26 is required to move only $\pm 1/6\ \Delta\theta$ or $\pm 1/6\ (3\times 4$ milliradians). This angular movement of $\Delta\alpha$ amounts to only $\pm 2$ milliradians. Assuming that the path from the directing mirror 26 to the exit lens 40 is 30 inches and that the path from the directing mirror 26 to the turning mirrors is 40 inches, it can be shown that the movement at the exit lens 40 is only $\pm 0.120$ inches. Thus, the diameter of the exit lens 40 is required to be only slightly larger in diameter than the lens in the '722 patent.

In an alternate embodiment, it will be apparent that the exterior directing mirror 36 may be rotated rather than the interior directing mirror 26. This may be preferred inasmuch as mirror 36 will ordinarily be much smaller than mirror 26 and therefore capable of being rotated more quickly. In particular, the required length of each of the mirrors is a function of its distance from the exit lens 40. The greater the distance, the larger the mirror required to redirect the beams. Thus, mirror 26 may need to be on the order of four times the length of mirror 36 (although the mirrors are of the same height).

Figure 3A:
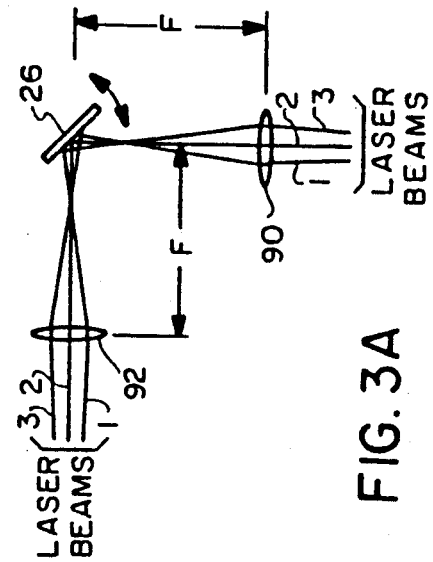
FIG. 3A illustrates how the size of the directing mirrors may be reduced.

As is apparent, the size of the mirrors is important in producing a commercially viable device. Depending on the size of the device it may be necessary to reduce the size of the mirrors 26 and/or 36. This can be accomplished by employing a first beam focusing lens 90 in front of the mirror 26 to converge the beams into a smaller pattern at the mirror surface; and a second condensing lens 92 after the mirror to reestablish the initial beam alignment. This is illustrated in FIG. 3A. Specifically, lens 90 converge the incoming beams to a much smaller area in its focal plane so that a smaller mirror 26 may be used, (for example 0.5" instead of 5"). Lens 92 has the same focal length F as lens 90 and restores the laser beam to their original paths (although inverted). The lens 90 and 92 are preferably cylindrical lens so that converging occurs only in the X-Y plane and not in the Z direction.

It should also be noted that between pulsing of the respective lasers 20a–20g so as to produce simultaneously each group of dots the directing mirror 26 must be rotated or moved to the next position. During this time interval between pulsing, the surface of the material to be marked will have been moved by a portion of the dot diameter by the conveyor carrying the material. As a result, this causes a lateral misalignment in which each group of dots are slightly offset from the other by a portion of the dot diameter. Therefore, in order to achieve collinear vertical character columns these lateral dot off-sets must be compensated or eliminated.

Figure 6:
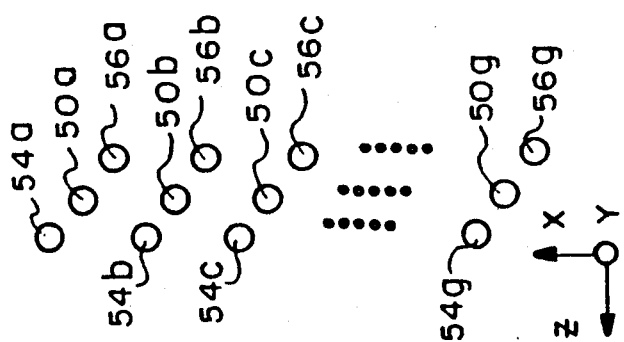
FIG. 6 is a representation of the three groups of dots produced by the present laser marker apparatus with n lateral compensation.

If no compensation is provided, a lateral offset between each of the three groups of dots results in the column dot pattern illustrated in FIG. 6. In order to correct for lateral displacement, which is a function of the velocity of the conveyor moving the items to be marked past the laser head unit 42, either mirror 26 or mirror 36 is rotated about an axis in the X-Y plane which is parallel to the front surface of the mirror.

A compensation device 72 is provided to accomplish this correct lateral alignment. The compensation device may be chosen depending upon the particular arrangement for its incorporation into the invention. If, for example, rotation is accomplished at mirror 26 conveyor compensation may be accomplished at mirror 36. In that event, any of the techniques previously described for rotating the mirrors can be employed. In particular, a bimorph piezo-electric device or a galvanometric movement can be used to rotate mirror 36 to accomplish correct lateral alignment to form a single column of 21 dots as shown in FIG. 4.

Alternatively, if it is desired to have one of mirrors 26 or 36 rotate for both purposes, than a somewhat more complicated arrangement would be required. In the case of a piezo-electric embodiment, a second bimorph would be required for the additional degree of rotation. The function and result would be the same as described in connection with FIG. 5: rotation of the mirror first about an axis to create the three columns of dots and about a second axis to compensate for the lateral offset due to the motion of the article being marked.

The amount of compensation is, of course, a function of the velocity of the conveyor carrying the items being marked. This information is known and in an open loop embodiment the conveyor speed is simply calculated and used to control the firing sequence for the lasers and the bimorphs. A closed loop system would employ a typical micro-processor based programmable controller in which an optical sensor or other feedback element would provide information on any variation in conveyor speed and permit adjustment of the mirrors and laser operation accordingly.

From the foregoing detailed description, it can be seen that the present invention provides an improved laser marker apparatus for marking indicia to a substrate in which the number of dot positions in a vertical column is increased. The present laser marker apparatus includes a directing mirror which is rotatable so as to produce three columns of spots on the substrate. Each of the three column has seven spots so as to produce a 21-dot high vertical column corresponding to a single column of a character matrix to be marked, thereby producing a higher resolution.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof.

For example, if the substrate to be marked is conveyed by a stepper motor drive so that during marking the substrate is motionless, than no lateral compensation is required to form the interleaved, extended column of dots. Also other types of lasers may be used and the number may be varied (such as 7 lasers to produce 14 dot columns with only a single displacement of the directing mirror or 3 lasers to produce 12 dot columns with 3 displacements of the directing mirror).

Therefore, it is intended that this invention not be limited to the particular embodiment disclosed as the best mode contemplated for carrying out the invention, but that the invention will include all embodiments falling within the scope of the appended claims.

What is claimed is:

1. A laser marker apparatus for marking indicia onto a substrate, comprising:

an exit lens having a focal length, the surface of the substrate to be marked being positioned generally at the focal plane of the lens;

a plurality of lasers arranged so that their energy output beams are oriented in a generally parallel relationship;

a plurality of turning mirrors positioned along the beam path of each respective laser and being oriented to reflect the output beams at predetermined angles, said angles being of sufficient magnitude to separate adjacent beams by at least one beam diameter;

reflecting means for redirecting the output beams from said plurality of turning mirrors onto the exit lens at said predetermined angles between the beams so as to form a first column of first spots on the substrate separated one from the other by at least the diameter of one spot; and first means for rotating said reflecting means to at least one additional position, each additional position forming an additional column of spots on the substrate, the spots formed by said columns being interleaved to create a composite column of higher resolution.

2. A laser marker apparatus as claimed in claim 1, wherein said reflecting means includes a directing mirror.

3. A laser marker apparatus as claimed in claim 1, wherein the substrate to be marked moves during marking, and further including second means for rotating said reflecting means to compensate for lateral misalignment of said columns due to said movement.

4. The apparatus of claim 3, wherein said reflection means includes first and second directing mirrors and said second means for rotating operates on a different one of said directing mirrors than said first means for rotating.

5. A laser marker apparatus as claimed in claim 1, wherein said plurality of lasers is comprised of seven lasers organized into three columns of seven spots so as to produce a 21-dot high interleaved column corresponding to a single column of a character matrix to be marked, thereby to produce a high resolution marking column.

6. A laser marker apparatus for marking indicia onto a substrate, comprising:

a plurality of lasers arranged so that their energy output beams are oriented in a generally parallel relationship;

a delivery tube through which the output beams travel;

an exit lens disposed at the end of the delivery tube remote from said laser and onto which the energy output beams are directed for focusing onto said substrate positioned at the focal plane of the lens;

a plurality of turning mirrors positional along the beam path of each respective laser and being oriented to reflect the output beams at predetermined angles, said angles being of sufficient magnitude to separate adjacent beams by at least one beam diameter;

reflecting means for redirecting the output beams from said plurality of turning mirrors onto the exit lens at said predetermined angles between the beams so as to form a first column of first spots on the substrate separated one from the other by at least the diameter of one spot; and first means for rotating said reflecting means to at least one additional position, each additional position forming an additional column of spots on the substrate, the spots formed by said columns being interleaved to create a composite column of higher resolution.

7. A laser marker apparatus as claimed in claim 6, wherein said reflecting means includes at least one directing mirror.

8. A laser marker apparatus as claimed in claim 6, wherein the substrate to be marked moves during marking, and further including seconds means for rotating said reflecting means to compensate for lateral misalignment of said columns due to said movement.

9. A laser marker apparatus as claimed in claim 6, wherein said plurality of lasers is comprised of seven lasers organized into three columns of seven spots so as to produce a 21-dot high interleaved column corresponding to a single column of a character matrix to be marked, thereby to produce a high resolution marking column.

10. The apparatus of claim 8 wherein said reflection means includes first and second directing mirrors and said second means for rotating operates on a different one of said directing mirrors than said first means for rotating.

11. The apparatus of claim 1 further including means for reducing the size of the reflecting means required to redirect the output beams whereby the reflecting means may be more rapidly rotated between positions to maximize marking speed.

* * * * *